United States Patent
Hasan et al.

(10) Patent No.: US 9,965,793 B1
(45) Date of Patent: May 8, 2018

(54) ITEM SELECTION BASED ON DIMENSIONAL CRITERIA

(71) Applicant: Amazon Technologies, Inc., Seattle, WA (US)

(72) Inventors: Shiblee Imtiaz Hasan, Seattle, WA (US); Manjeet Chayel Mohinder Singh, Seattle, WA (US); Joseph Edwin Johnson, Seattle, WA (US); Nathan Eugene Masters, Redmond, WA (US); Saurangshu Pandey, Redmond, WA (US); Benjamin Schwartz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 14/708,106

(22) Filed: May 8, 2015

(51) Int. Cl.
  *G06Q 30/00* (2012.01)
  *G06Q 30/06* (2012.01)
  *G06F 17/30* (2006.01)

(52) U.S. Cl.
  CPC ... *G06Q 30/0631* (2013.01); *G06F 17/30489* (2013.01); *G06F 17/30501* (2013.01); *G06F 17/30864* (2013.01)

(58) Field of Classification Search
  None
  See application file for complete search history.

(56) References Cited

U.S. PATENT DOCUMENTS

| | | | |
|---|---|---|---|
| 5,530,652 A | 6/1996 | Croyle et al. | |
| 5,913,217 A * | 6/1999 | Alger | G06F 17/30949 |
| | | | 707/693 |
| 5,963,940 A * | 10/1999 | Liddy | G06F 17/30654 |
| 6,353,821 B1 * | 3/2002 | Gray | G06F 17/30321 |
| | | | 707/715 |
| 7,121,469 B2 | 10/2006 | Dorai et al. | |
| 7,707,008 B1 | 4/2010 | Champlin et al. | |
| 7,970,661 B1 | 6/2011 | Abraham et al. | |

(Continued)

FOREIGN PATENT DOCUMENTS

| WO | WO 2013/063299 A1 | | 5/2013 | |
|---|---|---|---|---|
| WO | WO 2016/007318 | * | 7/2014 | G06F 7/00 |
| WO | WO 2016/106014 A1 | | 6/2016 | |

OTHER PUBLICATIONS www.energystar.gov, "Energy Star Most Efficient 2012—Medium (18 cu-ft and smaller) Refrigerator-Freezers", Apr. 11, 2012, ( https://web.archive.org/web/20120411172648/https://www.energystar.gov/index.cfm?c=most_efficient.me_medium_fridges_freezers ).*

(Continued)

*Primary Examiner* — Naeem U Haq
*Assistant Examiner* — Norman Donald Sutch, Jr.
(74) *Attorney, Agent, or Firm* — Knobbe, Martens, Olson & Bear, LLP

(57) ABSTRACT

Systems and methods are provided for determining dimensional criteria of a physical space and identifying a set of items that satisfy the dimensional criteria. For example, the dimensional criteria may be determined based on an image depicting the physical space or search terms provided by a user. Composite keys may be generated based on the dimensional criteria and one or more search terms provided by the user, and the generated composite keys may be used to search one or more databases storing sorted item keys and corresponding item identifiers.

23 Claims, 7 Drawing Sheets

(56) References Cited

U.S. PATENT DOCUMENTS

| | | | |
|---|---|---|---|
| 8,315,423 B1 | 11/2012 | Jing et al. | |
| 8,391,642 B1 | 3/2013 | Petruszka et al. | |
| 8,560,406 B1 | 10/2013 | Antony | |
| 8,600,784 B1* | 12/2013 | Ivey | G06Q 10/02 705/5 |
| 8,682,644 B1* | 3/2014 | Davis | G06F 7/22 704/8 |
| 8,725,573 B1 | 5/2014 | Narang et al. | |
| 8,725,595 B1 | 5/2014 | Siegel et al. | |
| 9,327,406 B1 | 5/2016 | Hinterstoisser et al. | |
| 2002/0002511 A1 | 1/2002 | Yim et al. | |
| 2004/0010430 A1 | 1/2004 | Cinquini et al. | |
| 2004/0201752 A1 | 10/2004 | Parulski et al. | |
| 2005/0044011 A1 | 2/2005 | Deal | |
| 2005/0060269 A1 | 3/2005 | Gaikoski | |
| 2008/0077511 A1 | 3/2008 | Zimmerman | |
| 2009/0010548 A1* | 1/2009 | Abernethy, Jr. | G06F 17/3025 382/209 |
| 2009/0254536 A1* | 10/2009 | Gu | G06F 17/30448 |
| 2009/0323084 A1 | 12/2009 | Dunn et al. | |
| 2010/0110073 A1 | 5/2010 | Abraham et al. | |
| 2010/0185629 A1* | 7/2010 | Jones | G06F 17/30631 707/753 |
| 2012/0081357 A1 | 4/2012 | Habbecke et al. | |
| 2012/0113223 A1 | 5/2012 | Hilliges et al. | |
| 2012/0284012 A1 | 11/2012 | Rodriguez et al. | |
| 2013/0106910 A1 | 5/2013 | Sacco | |
| 2013/0215116 A1 | 8/2013 | Siddique et al. | |
| 2013/0218799 A1* | 8/2013 | Lehmann | G06Q 10/083 705/337 |
| 2013/0258117 A1 | 10/2013 | Penov et al. | |
| 2013/0259308 A1* | 10/2013 | Klusza | G06K 9/00624 382/103 |
| 2014/0135966 A1 | 5/2014 | Pettersson et al. | |
| 2014/0244430 A1 | 8/2014 | Siegel et al. | |
| 2014/0270477 A1 | 9/2014 | Coon | |
| 2014/0285522 A1* | 9/2014 | Kim | G06T 19/006 345/633 |
| 2014/0351147 A1* | 11/2014 | Castrechini | G06Q 30/06 705/79 |
| 2015/0187091 A1 | 7/2015 | Hata et al. | |
| 2015/0202962 A1 | 7/2015 | Habashima et al. | |
| 2016/0117749 A1 | 4/2016 | Desmarais et al. | |
| 2016/0140205 A1* | 5/2016 | Hsu | G06F 17/30545 707/602 |
| 2016/0180193 A1 | 6/2016 | Masters et al. | |
| 2016/0180441 A1 | 6/2016 | Hasan et al. | |
| 2016/0180448 A1* | 6/2016 | Ravindra | G06Q 30/0643 705/26.63 |
| 2017/0243352 A1 | 8/2017 | Kutliroff et al. | |

OTHER PUBLICATIONS

Liz Stinson, "So Smart: New Ikea App Places Virtual Furniture in Your Home", Aug. 20, 2013 (https://www.wired.com/2013/08/a-new-ikea-app-lets-you-place-3d-furniture-in-your-home/) (Year: 2013).*
U.S. Appl. No. 14/579,536, filed Dec. 22, 2014.
U.S. Appl. No. 14/579,417, filed Dec. 22, 2014.
U.S. Appl. No. 14/579,522, filed Dec. 22, 2014.
U.S. Appl. No. 14/644,030, filed Dec. 22, 2014.
Princeton University—WordNet—A lexical database for English; 3 pages. Accessed May 8, 2015. https://wordnet.princeton.edu/.
Search Report and Written Opinion dated Mar. 15, 2016 in corresponding PCT Application No. PCT/US2015/065711.

* cited by examiner

ITEM SELECTION BASED ON DIMENSIONAL CRITERIA

BACKGROUND

Various methods are used by retailers (e.g., brick-and-mortar stores and Internet-based stores) in an attempt to sell items (e.g., goods and/or services). Some retailers attempt to use market-based data to promote items. For example, a retailer may identify or recommend to potential customers items that are best-selling or most popular among other customers. Some retailers may identify items that have received positive praise from third-party sources that may appeal to potential customers.

In some cases, retailers attempt to appeal to an individual customer by recommending items based on what other customers may have purchased who bought or viewed similar items. However, the retailer often does not know why the other customers selected the item and so such a recommendation may not be effective with some potential customers. For example, if a customer is looking to buy a new chair to place in the tight space between two pieces of furniture in the customer's bedroom, recommending other related items, such as a large table, that cannot fit into the space may not be helpful to the customer.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1A:
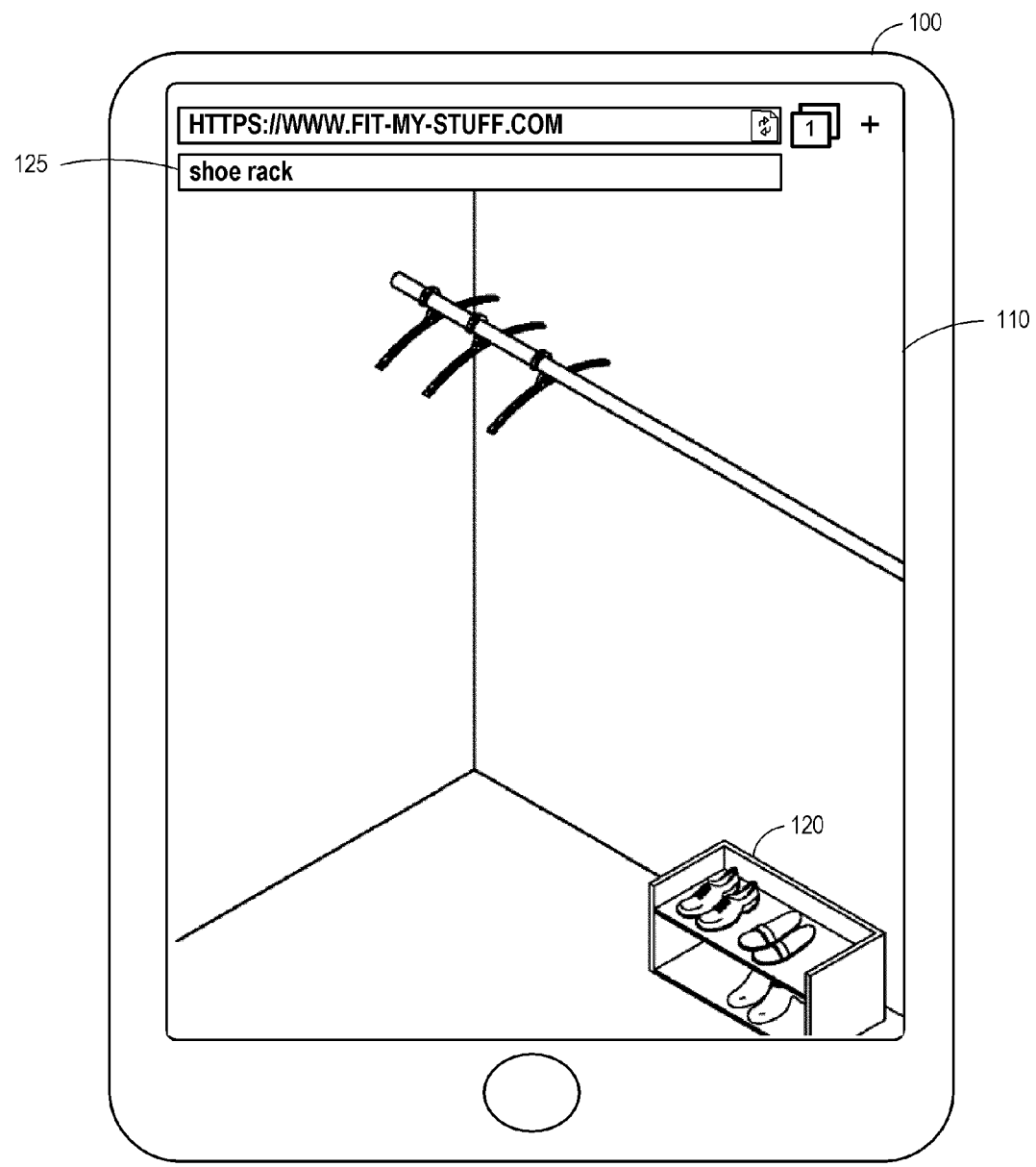
FIG. 1A is a pictorial diagram illustrating an example of a physical space in which additional items may be placed.

It can be difficult for a user to determine, at the time of shopping for new furniture such as a coffee table or a reclining chair, whether the pieces of furniture will fit nicely in the space that the user desires to place them. Although the sellers of such products often provide the product dimensions (e.g., length, width, and height), it may be difficult for the user to visualize whether a particular item will fit in the user's living room, for example, between the couch and the TV.

One solution is to measure the dimensions of the space in which the user desires to place the new item, and as the user finds items of interest, the user can compare the dimensions of the items and the measured space to determine whether the items will fit inside the measured space. However, such a solution requires manual comparison of the dimensions (e.g., are the length, width, and height smaller than the length, width, and height of the measured space?). Further, such a comparison is only possible after the user finds an item that he or she likes, thereby resulting in wasted time and effort and even in disappointment. It would be much more efficient to be able to browse a list of items that the user knows will fit inside the user's space and choose an item from the list. Thus, an improved method of identifying items that satisfy user-specified dimensional criteria is desired.

Accordingly, embodiments of systems and methods described herein provide users with access to an item identification service that enables users to view a list of items that satisfy particular dimensional criteria. As used herein, the phrase "dimensional criteria," in addition to having its ordinary meaning, is used to refer to length, width, height, area, volume, or other parameters that provide spatial sizes, shapes, or measurable extents of an item. The systems and methods described herein can enable a user to provide keywords (e.g., black chair) along with the dimensions of a physical area (or a picture depicting the physical area) and view a list of items that correspond to the keywords and can also fit within the specified dimensions. The keyword(s) and the dimension(s) of the physical area (e.g., dimensional criteria) provided in a search request initiated by the user may collectively be referred to herein as "search criteria." In addition, systems and methods described herein can recommend complementary items (e.g., chairs) that may fit in the physical space along with any such items identified based on the keywords and the dimensions (e.g., a table).

For purposes of illustration, the processes disclosed herein are described primarily in the context of an interactive computing system that presents users with items available for purchase or other acquisition from an electronic catalog or marketplace. The interactive computing system can be implemented as a network resource or application, which may be a website, a mobile application, a combination of the same, or the like. As will be apparent, the disclosed processes can also be used in other types of systems, and can be used to access information regarding any physical items, such as but not limited to, search results, news, social networking content, images, blogs, etc.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term "item" is also sometimes used herein to refer only to the item itself or only to its representation in the computer system. Further, not necessarily all advantages described herein are shared by every embodiment of this disclosure.

Although dimensions (e.g., length, width, height, etc.) are primarily used to describe the various embodiments discussed herein, other item parameters or constraints such as volume, weight, or combinations thereof (or any other physical or logical metric) may also be used instead. In the present disclosure, the terms "physical area" and "physical space," in addition to having their ordinary meaning, are sometimes used interchangeably.

Augmented Reality, Image Processing, and Preview Generation

Embodiments of systems and processes described herein may take advantage of augmented reality techniques to present an image of a recommended item to a user in the context of the location where the user desires to use the item. Augmented reality may enable a user to view on a screen of a user computing device an image with annotations or additional information. In some cases, an image captured by an optical device (e.g., still or video camera) of a user computing device can be modified or supplemented and presented to the user on a display of the user computing device with the changes to the captured image. For example, a camera of a smartphone may capture images of a street that a user is walking along. The display of the smartphone may display the captured image of the street and may overlay arrows indicating which direction the user should turn to reach a particular destination.

Embodiments of systems and processes herein may obtain an image of a physical area, such as a living room, and any objects within the physical area such as a sofa or a bookcase. Based on the image, the system can determine the dimensions of any bounding boxes (e.g., physical areas at least partially bound by other items in the image). Using the dimensions of the bounding boxes, the system can identify a set of items that would fit in the bounding boxes. Further, an image can be generated and presented on a display of the user device that illustrates the one or more identified items placed in the physical area, thereby providing the user with a preview of the physical area with the identified items placed therein.

Example Use

Figure 1B:
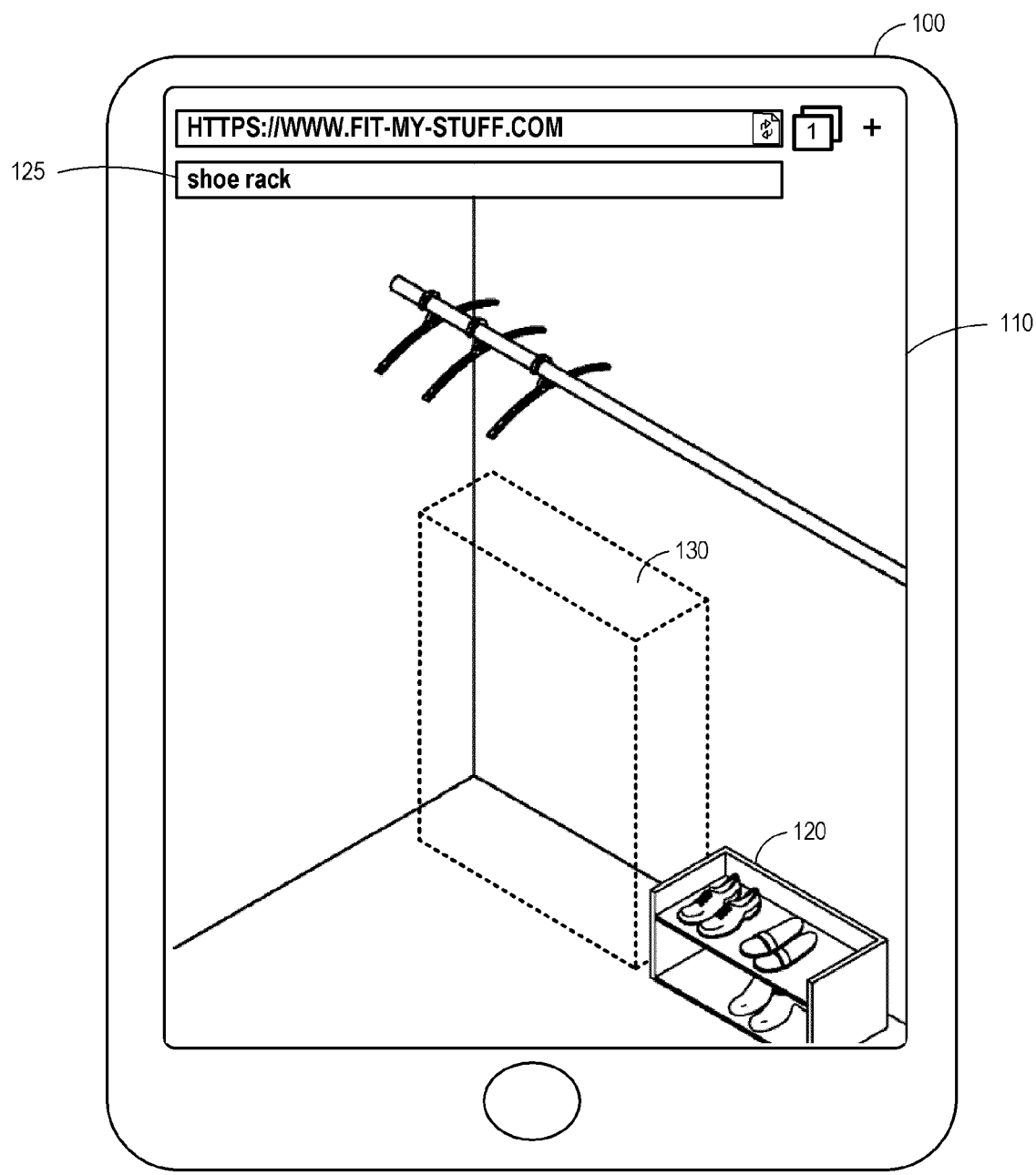
FIG. 1B is a pictorial diagram illustrating an imaginary bounding box that may limit the size of the additional items to be placed in the physical space of FIG. 1A.
Figure 1C:
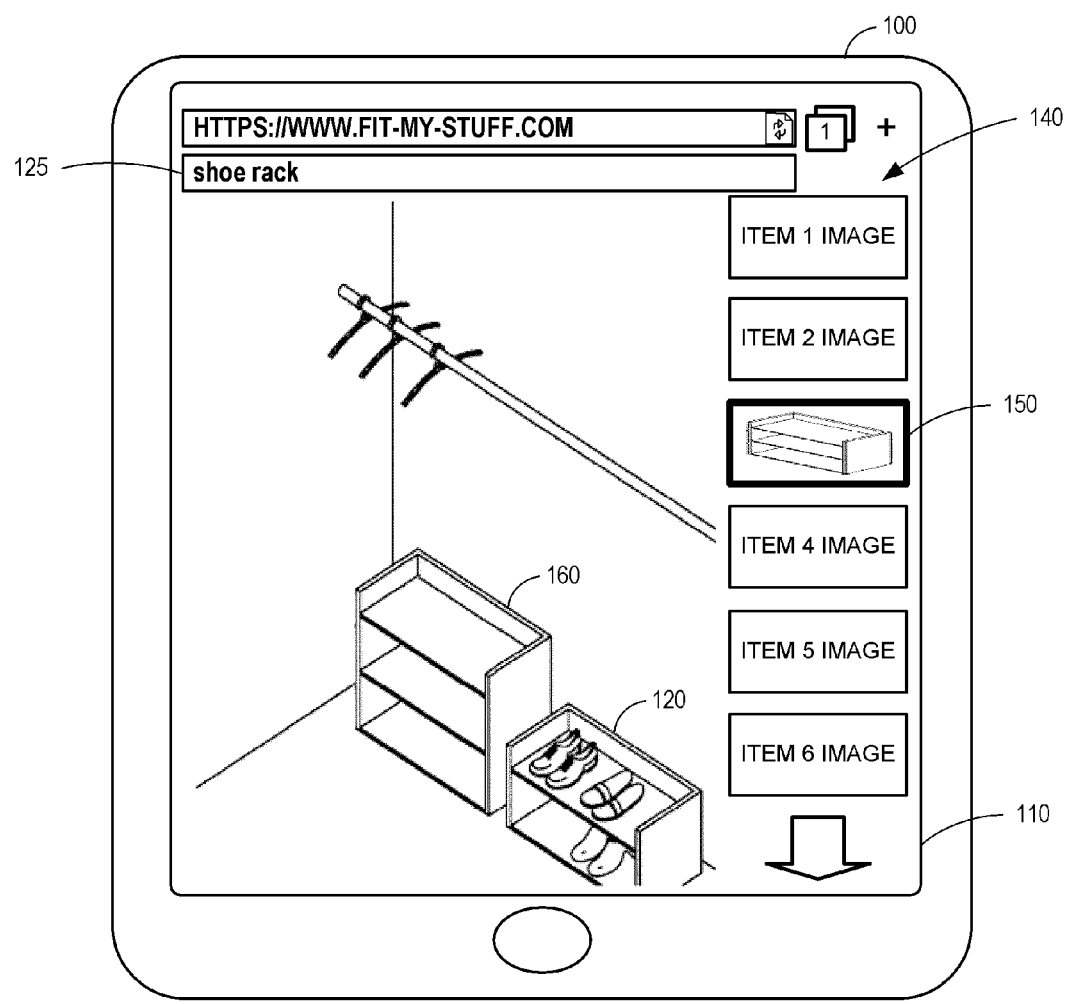
FIG. 1C is a pictorial diagram of a sample preview image illustrating how the selected additional item may be placed in the physical space of FIG. 1A.

Turning to FIGS. 1A-1C, a preview image may be generated that illustrates how additional items can be placed in a user's physical space (e.g., closet in this example) is described. FIG. 1A illustrates the user's computing device 100 showing an image of the user's closet 110, which includes a shoe rack 120. The user may provide the keyword "shoe rack" to indicate that the user desires to limit the search to items related to shoe racks. For example, the user may be looking for a new shoe rack that can be placed in the closet 110 and may have captured the image of the empty space in the closet 110 to find out which shoe racks can fit in the empty space.

FIG. 1B illustrates a bounding box 130 that is determined based on the image of the closet 110. The system may detect the walls of the closet 110 and the shoe rack 120 (e.g., using edge detection or corner detection techniques) and determine the bounding box 130 that is bounded at least partially by the walls and the shoe rack 120. The system may also determine the dimensions (e.g., length, width, and height) of the bounding box 130. Additionally, the system may identify one or more additional bounding boxes.

FIG. 1C illustrates a user interface generated by the system for selecting from a set of items 140 that fit in the user's closet 110, and a preview image demonstrating the placement of the selected item 150 in the user's closet 110. The presentation of the preview image may be static or may be a form of augmented reality. In other words, in some cases, the preview image is presented to the user while the computing device 100 continues to capture images of the user's closet 110 without the selected item 150, and in other cases, the preview image that does not contain augmented reality elements is generated and displayed to the user. Thus, the systems described herein can identify items that will fit in the user's intended location. Presenting the preview image illustrating the shoe rack in the context of the user's closet 110 may help improve the effectiveness of the recommendation and reduce the rate of returns for purchased items.

Overview of Interactive Computing System

Figure 2A:
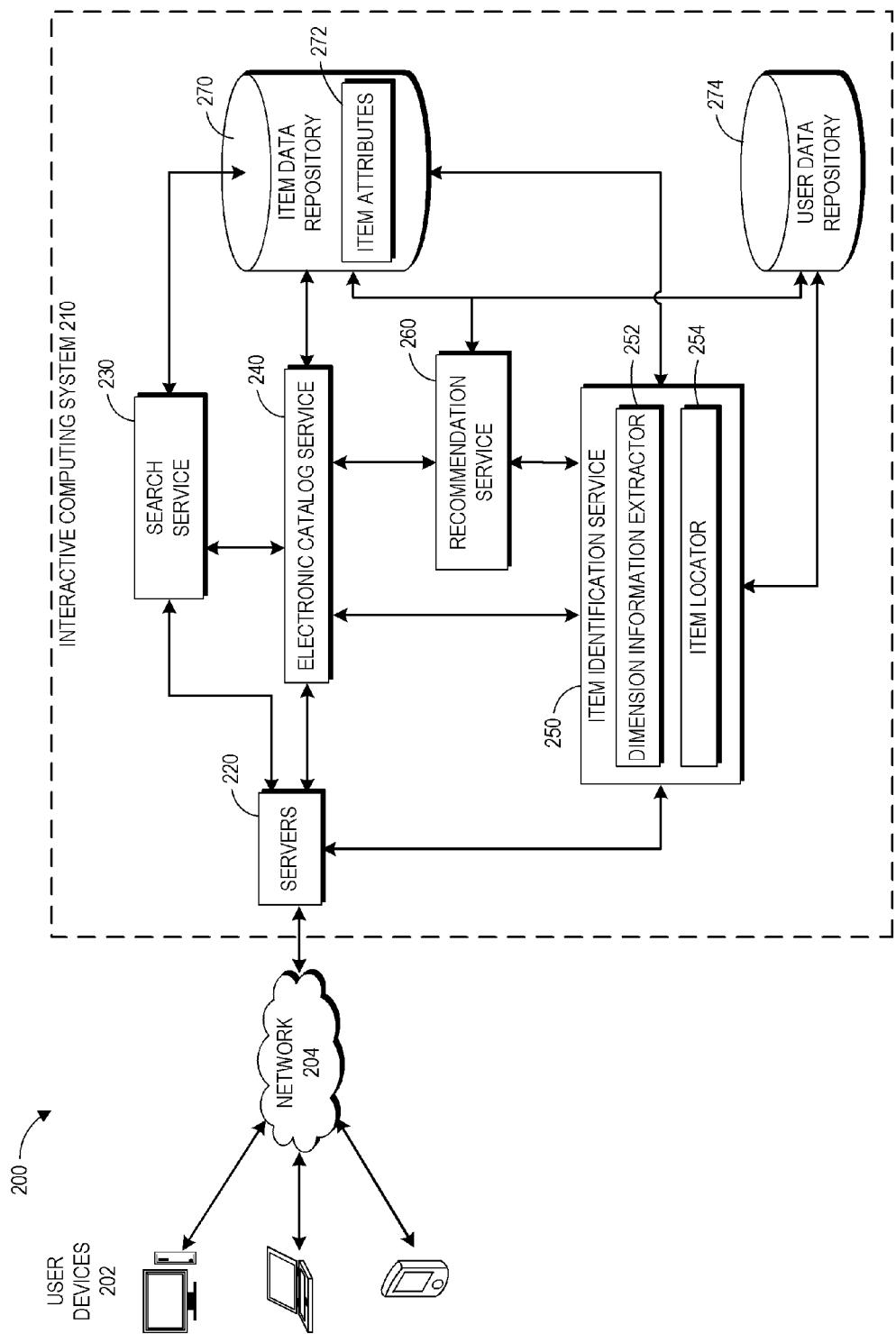
FIG. 2A is a block diagram depicting an illustrative operating environment for identifying items that satisfy certain dimensional criteria.

Turning to FIG. 2A, an example computing environment 200 is shown in which access to an interactive computing system 210 is provided to user devices 202 over a network 204. The interactive computing system 210 can represent a hardware platform or software platform (that is implemented using hardware) for which users can search and browse an electronic catalog of items.

When users of the user devices 202 connect to the interactive computing system 210 over the network 204, the interactive computing system 210 can provide the users with an electronic catalog that lists items that may be purchased by the users. The interactive computing system 210 may allow the user to browse or search the electronic catalog. The items that are listed in the electronic catalog may have different dimension parameters (e.g., length, width, and height).

By way of illustration, various example user devices 202 are shown connecting to the interactive computing system 210, including a desktop computer, laptop, and a mobile phone. In general, the user devices 202 can be any computing device such as a desktop; laptop; mobile phone (or smartphone); tablet; kiosk; gaming console or controller; television; eyeglasses; goggles; wristwatch (including a smartwatch); electronic book reader; wireless device; set-top box or other television box; media player; one or more processor devices; integrated circuit components for inclusion in computing devices, appliances, electronic devices for inclusion in vehicles, appliances, or machinery; etc. The user devices 202 access the interactive computing system 210 over a network 204. The network 204 may be any wired network, wireless network, or combination thereof. In addition, the network 204 may be a personal area network, local area network, wide area network, over-the-air broadcast network (e.g., for radio or television), cable network, satellite network, cellular telephone network, or combination thereof. For example, the network 204 may be a publicly accessible network of linked networks, possibly operated by various distinct parties, such as the Internet. In some embodiments, the network 204 may be a private or semi-private network, such as a corporate or university intranet. The network 204 may include one or more wireless networks, such as a Global System for Mobile Communications (GSM) network, a Code Division Multiple Access (CDMA) network, a Long Term Evolution (LTE) network, or any other type of wireless network. The network 204 can use protocols and components for communicating via the Internet or any of the other aforementioned types of networks. Further, the interactive computing system 210 may be implemented in hardware and/or software and may, for instance, include one or more physical or virtual servers implemented on physical computer hardware configured to execute computer executable instructions for performing various features that will be described herein. The one or more servers may be geographically disbursed or geographically co-located, for instance, in one or more data centers.

In the depicted embodiment, the interactive computing system 210 includes servers 220, which can communicate with the user devices 202 over the network 204 and which can provide access to various services of the interactive computing system 210. The services of the interactive computing system 210 include, in the depicted embodiment, a search service 230, an electronic catalog service 240, an item identification service 250, and a recommendation service 260. These services 230, 240, 250, 260 can be implemented as software components executing in physical computer hardware on the servers 220 or in separate computing devices. Moreover, the processing of the various components or services of the interactive computing system 210 can be distributed across multiple machines, networks, or other computing resources. The various components or services of the interactive computing system 210 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the interactive computing system 210 can be stored in the memories of the servers 220 and/or on other types of non-transitory computer-readable storage media. While some examples of possible connections are shown, any subset of the components shown can communicate with any other subset of components in various implementations.

The search service 230 and the electronic catalog service 240 can provide users with access to an electronic catalog stored in an item data repository 270. The search service 230 and/or electronic catalog service 240 can provide users with access to the items in the electronic catalog by way of a network site, which may be a network resource such as a website or a mobile application. For example, the electronic catalog service 240 can generate network pages that include detailed information about particular items (e.g., item detail pages).

The electronic catalog or marketplace may present information about items that may be purchased, rented, or otherwise accessed by the users of the user devices 202. The information can be hierarchically organized according to categories, subcategories, and the like. As described above, the electronic catalog information contained in the item data repository 260 can include items other than products or services, such as blogs, periodicals, social networking profiles, or the like.

The item identification service 250 of the interactive computing system 210 can determine the dimensional criteria associated with a user request, identify a set of items that satisfy the dimensional criteria, and provide the set of items to the user via the user device 202. As illustrated in FIG. 2A, the item identification service 250 includes a dimension information extractor 252 and an item locator 254 in the depicted embodiment. The dimension information extractor 252 can perform various tasks associated with providing an item identification service to the users of the interactive computing system 210. Since the item identification service provided to the user involves determining the dimensional criteria associated with a user request (e.g., the user may initiate a request to search for items in the electronic catalog, and the request may include various search terms, some of which may specify the dimensional criteria, such as length, width, or height, of the item that the user is looking for) and identifying a set of items that satisfy the dimensional criteria, the dimension information extractor 252 may determine, based on the information included in the user request, dimensional criteria associated with the user request and the item locator 254 may access the item data repository 270 and examine item attributes 272 to compile a set of items that satisfy the dimensional criteria determined by the dimension information extractor 252 (as well as any other keywords or search terms included in the search request). The item attributes 272 of an item may indicate the length, weight, height, and any other parameter that defines the physical characteristics of the item. For example, if the user wanted to find a coffee table that is 5 feet in length, the user may request a search using the terms "5 foot long coffee table." Upon receiving the search request including the terms "5 foot long coffee table," the dimension information extractor 252 may determine that the dimensional criteria associated with the request include a length of 5 feet. Based on the dimensional criteria extracted by the dimension information extractor 252 and the other search terms included in the search request (e.g., "coffee" and "table"), the item locator 254 may determine a set of items that satisfy the search criteria specified by the search request. Additional details for determining the dimensional criteria and identifying a set of items that satisfy the dimensional criteria are described in greater detail below with respect to FIGS. 3A and 3B.

With continued reference to FIG. 2A, the recommendation service 260 of the interactive computing system 210 can provide users with item recommendations while they are browsing the electronic catalog, based on information contained in the item data repository 270 (such as any item association data generated based on observed user behavior with respect to item views and/or purchases) and the user data repository 274 (such as the particular user's purchase, searching, or browsing history). As discussed above, in the depicted embodiment, the item data repository 270 includes item attributes 272, which may include various attributes of the items in the electronic catalog. The attributes may include, in addition to the dimensional attributes such as length, width, and height, one or more of weight, volume, price, item type, etc. The user data repository 274 may store user data including membership type, purchase history, browsing history, search history, etc.

General Architecture of a Computing System

Figure 2B:
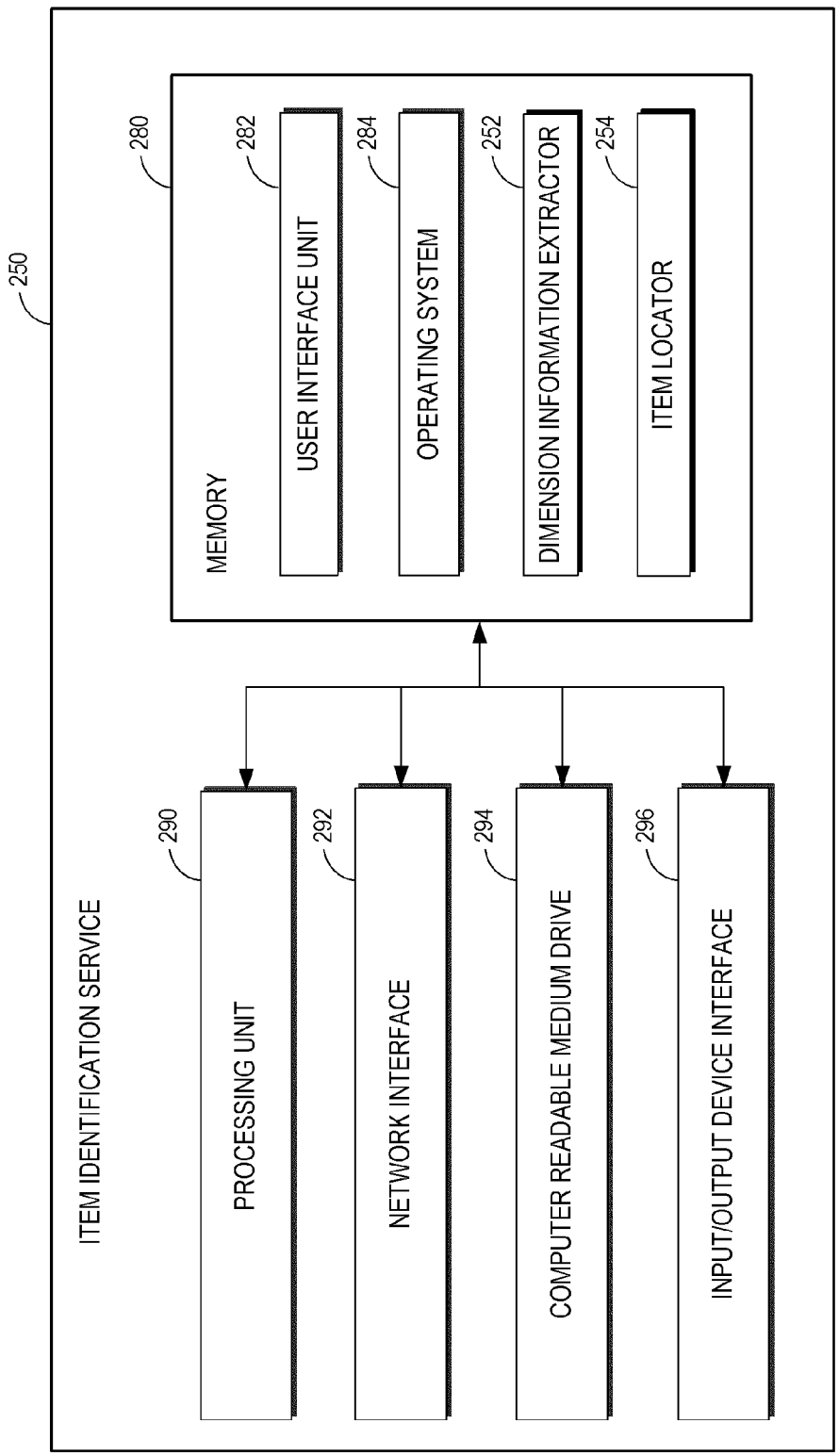
FIG. 2B depicts a general architecture of a computing device providing an item identification service for determining dimensional criteria and identifying a set of items that satisfy the determined dimensional criteria.

FIG. 2B depicts a general architecture of a computing system (referenced as item identification service 250) that determines the dimensional criteria and identifies a set of items that satisfy the dimensional criteria. The general architecture of the item identification service 250 depicted in FIG. 2B includes an arrangement of computer hardware and software modules that may be used to implement aspects of the present disclosure. The item identification service 250 may include many more (or fewer) elements than those shown in FIG. 2B. It is not necessary, however, that all of these generally conventional elements be shown in order to provide an enabling disclosure. As illustrated, the item identification service 250 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 204. The processing unit 290 may also communicate to and from memory 280 and further provide output information for an optional display (not shown) via the input/output device interface 296. The input/output device interface 296 may also accept input from the optional input device (not shown), such as a keyboard, mouse, digital pen, microphone, touch screen, gesture recognition system, voice recognition system, accelerometer, gyroscope, camera, etc.

The memory 280 may contain computer program instructions (grouped as modules in some embodiments) that the processing unit 290 executes in order to implement one or more aspects of the present disclosure. The memory 280 generally includes RAM, ROM and/or other persistent, auxiliary or non-transitory computer-readable media. The memory 280 may store an operating system 284 that provides computer program instructions for use by the processing unit 290 in the general administration and operation of the item identification service 250. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, memory 280 may include or communicate with the item data repository 270, the user data repository 274, and/or one or more other data stores, as discussed above with reference to FIG. 2A.

In addition to and/or in combination with the user interface unit 282, the memory 280 may include a dimension information extractor 252 and an item locator 254 that may be executed by the processing unit 290. In one embodiment, the user interface unit 282, dimension information extractor 252, and item locator 254 individually or collectively implement various aspects of the present disclosure, e.g., determining dimensional criteria, identifying a set of items that satisfy the dimensional criteria, etc., as described further below.

While the dimension information extractor 252 and the item locator 254 are shown in FIG. 2B as part of the item identification service 250, in other embodiments, all or a portion of a dimension information extractor and/or an item locator may be implemented by other components of the interactive computing system 210 and/or another computing device. For example, in certain embodiments of the present disclosure, another computing device in communication with the interactive computing system 210 may include several modules or components that operate similarly to the modules and components illustrated as part of the item identification service 250. It will also be appreciated that, in some embodiments, a user device may implement functionality that is otherwise described herein as being implemented by the elements and/or modules of the item identification service 250. For example, the user computing device 202 may receive code modules or other instructions from the item identification service 250 and/or other components of the interactive computing system 210 via the network 204 that are executed by the user computing device 202 to implement various aspects of the present disclosure.

Example Item Identification Processes

Figure 3A:
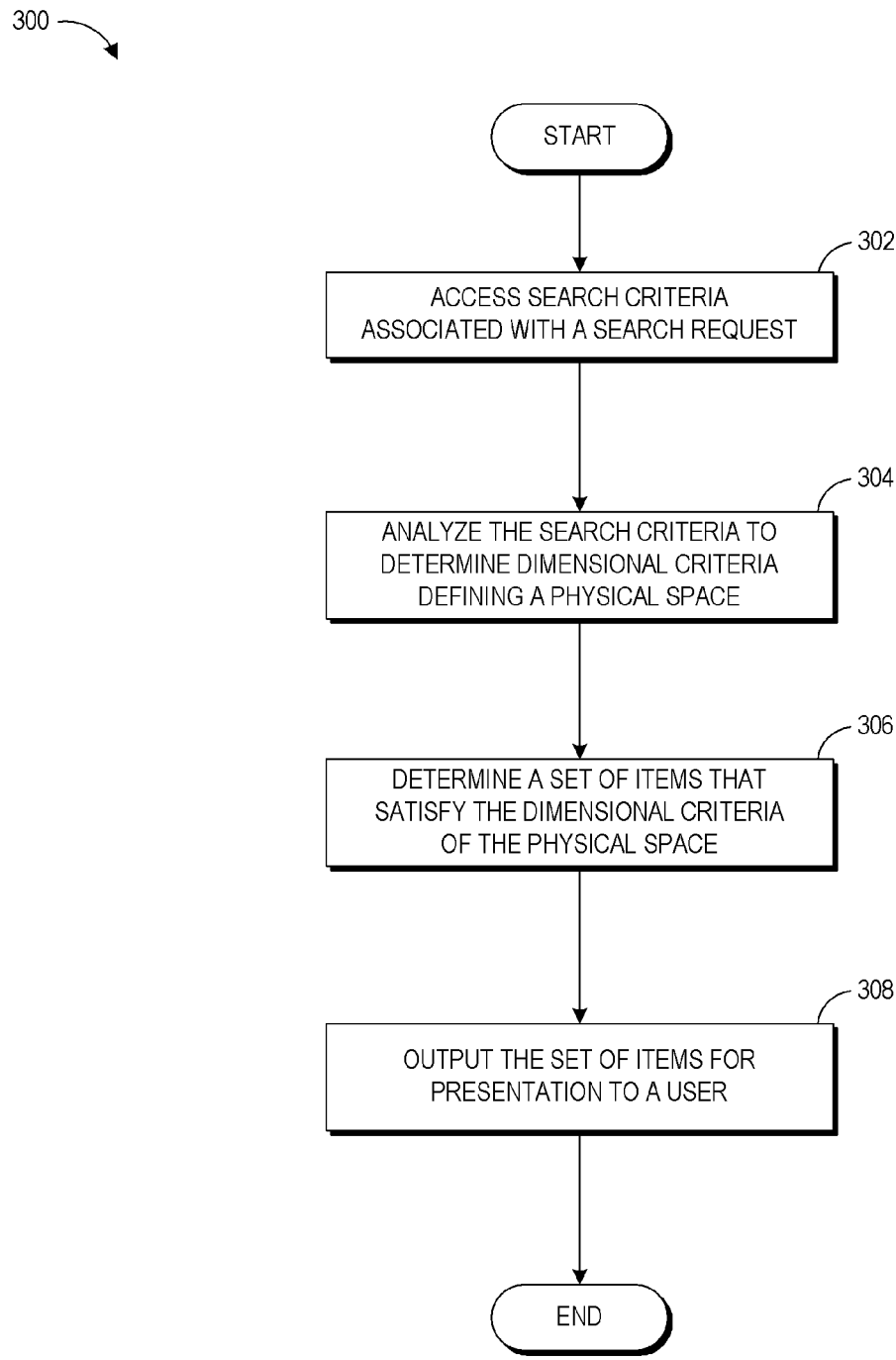
FIG. 3A is a flow diagram of an illustrative method implemented at least in part by an item identification service for determining dimensional criteria and outputting a set of items that satisfy the determined dimensional criteria.
Figure 3B:
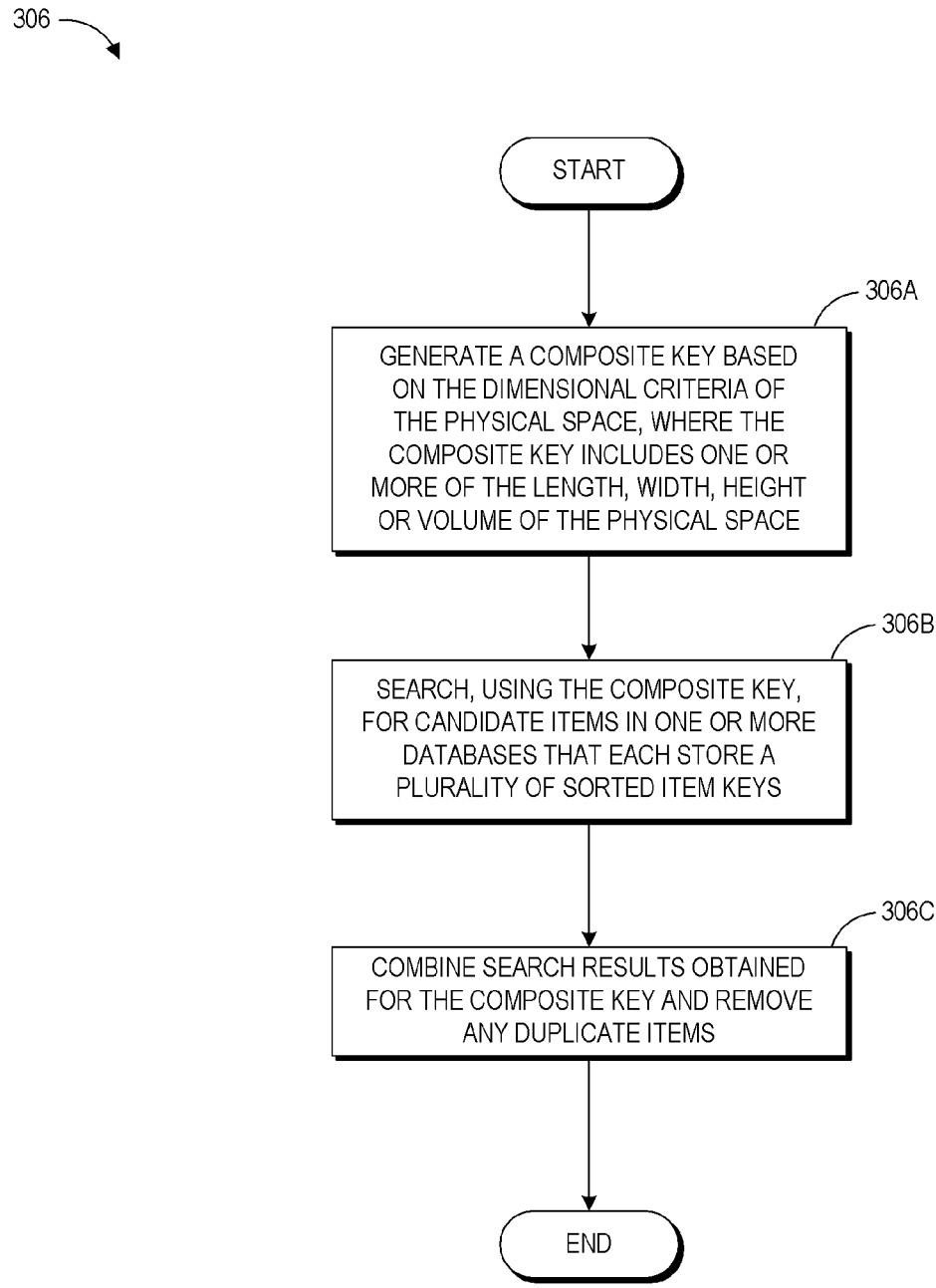
FIG. 3B is a flow diagram of an illustrative method implemented at least in part by an item identification service for identifying items that satisfy certain dimensional criteria.

Turning to FIGS. 3A and 3B, example processes that may be implemented by the interactive computing system 210 (e.g., the item identification service 250) are shown. In particular, FIG. 3A depicts a process 300 for determining dimensional criteria and outputting a set of items that satisfy the determined dimensional criteria, and FIG. 3B depicts a process 306 for identifying items that satisfy certain dimensional criteria. For convenience, the processes will be described in the context of the devices and systems shown in FIG. 2A. However, it should be understood that the processes can be implemented by any computing device and not just the computing devices shown in FIG. 2A.

With reference to FIG. 3A, in the process 300, a user of a user device 202 can submit a search request to the interactive computing system 210 to search for one or more items that can fit in a given physical space (e.g., the user's closet or living room), and in response to the search request, the interactive computing system 210 may display, via the user device 202, a list of items that can fit in the given physical space.

At block 302 of the process 300, the item identification service 250 accesses search criteria associated with a search request. The search criteria may include search terms included in the search request. For example, the search request may include the terms "5 foot long coffee table." In another example, the search request may include the terms "coffee table" and an image that depicts the user's closet. The user may capture an image of the physical space in which the user desires to place one or more additional items, and the user device 202 may provide the captured image to the item identification service 250 along with the search request. In such an example, the search criteria may be the combination of the search terms and the image included in (or otherwise associated with) the search request. In yet another example, the search criteria may include keywords and dimension information specified by the user (e.g., keywords="black table," length="5 feet," width="4 feet," and height="3 feet").

At block 304, the item identification service 250 analyzes the search criteria to determine dimensional criteria of the physical space. For example, if the search criteria accessed by the item identification service 250 include an image of the physical space at block 302, the image may depict one or more objects that restrict the space available for the additional items that the user desires to place therein. For example, as shown in FIG. 1B, the closet walls, the closet floor, the shoe rack, the hanger collectively restrict the amount of room that is available for placing additional items. Based on such restrictions, the item identification service 250 may identify one or more bounding boxes in the physical area, and determine the dimensions of the identified bounding boxes. In the example of FIG. 1B, the bounding box 130 is placed between the shoe rack 120 and the closet walls. The identified bounding box may share one or more of its edges with other objects depicted in the image. In the example of FIG. 1B, even though the physical space is not restricted in the direction that the depicted shoes are pointing, the item identification service 250 has determined the bounding box having the dimensions so that the bounding box can be lined up alongside the shoe rack. The dimensional criteria determined by the item identification service 250 may include the lengths, widths, and heights of the bounding boxes identified in the physical area depicted in the image. Alternatively, if the search criteria accessed by the item identification service 250 at block 302 include dimensions or other values that provide spatial extents, the item identification service 250 may extract such dimensions or spatial extents from the search request and use them as the dimensional criteria of the physical space.

At block 306, the item identification service 250 determines a set of items that satisfy the dimensional criteria of the physical space. The item identification service 250 may access the item data repository 270 and apply one or more filters to determine a list of items that satisfy the dimensional criteria. For example, the item identification service 250 may determine a list of items based on the keywords provided by the user (e.g., black coffee table), and select only those items that satisfy the dimensional criteria (e.g., has a length less than or equal to 5 feet, has a width less than or equal to 4 feet, and has a height less than or equal to 3 feet). The techniques for determining the set of items that satisfy the dimensional criteria are further described below with reference to FIG. 3B.

At block 308, the item identification service 250 outputs the set of items for presentation to a user. For example, the items may be presented to the user in the form of a scrollable list as shown in FIG. 1C. Further, as shown in FIG. 1C, one of the items (e.g., one selected by the user) may be superimposed on the image of the user's physical space as an overlay image.

In the process 300, one or more of the blocks shown in FIG. 3A may be removed (e.g., not performed), modified, and/or the order in which the method 300 is performed may be switched. For example, the process 300 may further include block 310 for generating a preview image based on the image provided by the user and the set of items that satisfy the dimensional criteria. In yet another example, the process 300 may identify complementary items (e.g., a table and two chairs) that may collectively fit in the physical area. In such an example, if the search criteria included the term "table," the item identification service 250 may, in addition to identifying a table that the searched for, identify two chairs that might fit into the physical space along with the identified table. In yet another example, the process 300 may include receiving a user selection of one of the items in the output set of items, and displaying additional details associated with the selected item (e.g., an item detail page including item description, item price, item reviews, etc.). The additional details may include a user interface for initiating a transaction for purchasing the selected item (e.g., a button for adding the item to the user's shopping cart). Thus, the embodiments of the present disclosure are not limited to or by the example shown in FIG. 3A, and other variations may be implemented without departing from the spirit of this disclosure Turning to FIG. 3B, a process 306 is shown. The process 306 is an example process that the item identification service 250 may perform at block 306 of the process 300 of FIG. 3A. The process 306 can be used to identify items that satisfy certain dimensional criteria (e.g., determined by the dimension information extractor 152). For example, a plurality of item identifiers corresponding to the various items in the electronic catalog may be stored in one or more databases. In such an example, the item identifiers may be stored in the database using key-value pairs, where the key is a parameter that is used to look up the value associated with the key, and the value is an item identifier (or multiple item identifiers). In an simple example, the item identification service 250 may generate a key based on the search request initiated by a user, look up the generate key in an item database storing a plurality of item identifiers, and retrieve the value (which may include one or more item identifiers in this case) associated with the key. The process 306 described below includes additional details of the steps that the identification service 250 may perform to determine the set of items that satisfy the dimensional criteria associated with a search request.

At block 306A of the process 306, the item identification service 250 generates a composite key based on the dimensional criteria of the physical space. As used herein, the term "composite key," in addition to having its ordinary meaning, can refer to a key that includes multiple parameters (e.g., where each parameter specifies a trait that an item in the item database may possess, such as length, height, width, region, color, etc.). The composite key may be used to query a database storing such keys or other similar keys. In the database, each key may be associated with one or more item identifiers that each identify an item available on the interactive computing system 210. For example, the items may be those included in the electronic catalog. The item identifiers stored in the item data repository 270 or other databases may be compressed using any data compression techniques. For example, a string of characters that appear in a threshold number of item identifiers can be replaced with a number of bits that are shorter than the string of characters. The compressed item identifiers may be decompressed so that they can be used to identify the corresponding items in the electronic catalog for presentation to the user. The use of compression techniques can lead to significantly reduced storage requirements for the item identifiers in some implementations, which may advantageously provide a more efficient interactive computing system 210.

In some examples, the interactive computing system 210 includes multiple databases that each handle a subset of the dimensions, items, keys, etc. For example, each database may handle a different set of dimensional values (e.g., one for length and one for width and height) without sharing any dimensional values. The generated composite key may include some or all of the dimensional criteria such as the length, width, or height. The composite key may also include keywords specified by the user. Additionally, the composite key may include other identifiers that may be used to categorize the items. For example, the composite key may include a value corresponding to item popularity.

For example, an illustrative composite key may be "NA-chair-L100-25000." "NA" may indicate the region (e.g., North America) associated with the user (e.g., the user is interested in items that are available in North America). "Chair" may indicate the keyword provided by the user. "L100" may indicate that the length of the physical space is 100 cm. "250000" may indicate that the volume of the physical space is 250,000 $cm^3$. This example composite key, if present in the database, may be associated with one or more item identifiers that correspond to all the items that are available in the North America region, is a chair, has a length of 100 cm, and has a volume of 250,000 $cm^3$. In other implementations, the dimensional units may be different than cm (e.g., inches, feet, meters, etc.). Having the "NA" and "chair" at the beginning of the composite key allows the item identification service 250 to filter the item keys based on the region and/or the keywords before searching for the dimensional values. In another example, the composite key may have volume before any other dimensional values so that the item identification service 250 may filter item keys based on volume before searching for the dimensional values (e.g., NA-table-250000-L100, NA-table-250000-W50, NA-table-250000-H50, etc.). Depending on the granularity of the database, the example composite key may additionally be associated with items having dimensional values that are within a predetermined range from the specified value (e.g., lengths from 99.0 cm to 100.00 cm for L100). In some embodiments, the composite key may include all the dimensional criteria (e.g., "NA-table-L200-W200-H100-4000000). In other example, the composite key may include a single dimensional value, or two or more dimensional values.

In some implementations, the interactive computing system 210 includes multiple databases each containing a subset of the available item keys. For example, the interactive computing system 210 may include one set of servers responsible for a database containing length-related keys, another set of servers responsible for a database containing width-related keys, and yet another set of servers responsible for a database containing height-related keys. In some embodiments, the items may further be split into multiple "buckets" based on the dimensional values associated with the items, and each bucket of items may be implemented in a separate database. For example, the item identifiers may be divided into multiple databases based on volume, where item identifiers corresponding to small items are stored in one database, item identifiers corresponding to medium-sized items are stored in another database, and item identifiers corresponding to large items are stored in yet another database. The items may be divided into any number of buckets based on any number/combination of dimensional criteria.

Each database may be implemented as a binary search tree. In other embodiments, some or all of the databases are implemented using one or more of 2-3 trees, red-black trees, and B-trees. In some embodiments, some or all of the databases may be implemented using KD-trees (k-dimensional trees), which may be desirable for performing geometric searches. KD-trees are binary search trees that look left/right and up/down based on a positional/dimensional key rather than just left or right based on a numeric key (which is what binary search trees typically do). In some implementations, binary search trees may provide improved performance (e.g., provide faster searches) if the data stored in the binary search trees are read-only. For example, inserting items into a binary search tree may unbalance the tree, which may greatly increase the lookup time. In such implementations, the databases that are read-only may be implemented using binary search trees, and the databases that are not read-only may be implemented using one of B-trees, red-black trees, 2-3 trees, or other self-balancing trees that may rebalance themselves as items are updated or inserted.

The stored keys may be sorted such that once the item identification service 250 has arrived at a block associated with a given key (e.g., NA-chair-L90), the item identification service 250 can continue to the next blocks (e.g., NA-chair-L91, NA-chair-L92, NA-chair-L93, etc.) by a linked list fashion. The running time complexity for such a data structure may be $O(\log_2(N)+K)$ where N is the number of entries in the data structure and K is a function of the maximum number of dimensions for which the data structure may be searched. In some implementations, each lookup may take anywhere from 50 ms (untuned) down to 0.1 ms (under optimum conditions). In some embodiments, multiple composite keys may be generated. The composite key may include one or more of the length, width, height, or volume of the physical space.

At block 306B, the item identification service 250 searches, using the generated composite keys, for candidate items in one or more databases. Each database may store a plurality of sorted item keys that are each associated with one or more item identifiers. For example, each item identifier may identify a corresponding item in the electronic catalog.

In some cases, identifying items that satisfy the dimensional criteria but have dimensional values that are very far from the dimensional criteria may not be useful to the user. For example, if the user is looking for a couch that can fit into a bounding box having a length of 12 feet, a width of 5 feet, and a height of 4 feet, the user is probably not interested in any small chairs. Thus, in some embodiments, the item identification service 250 searches for items that have dimensional values that are within a threshold range of the dimensional criteria of the physical space. For example, the threshold range may be 90% of the dimensional criteria. In another example, the threshold range may be selected from a range of 50% to 100%. Further, different dimensions may have different threshold ranges, and the item identification service 250 may allow the user to specify the threshold range for each dimension. In one example, in order to search for chairs that can fit in a bounding box of L100× W100×H50, the item identification service 250 may generate and look up a composite key that reads "NA-chair-L90-W90-H45" in the database and move to "NA-chair-L90-W90-H46," "NA-chair-L90-W90-H47," "NA-chair-L90-W90-H48," "NA-chair-L90-W90-H49," and "NA-chair-L90-W90-H50." Then, the item identification service 250 may generate and look up "NA-chair-L90-W91-H45," and do the same for "W91," "W92," and so on. Then, lastly, the item identification service 250 may repeat the process for L91, L92, and all the way up to L100.

In another example, there may be three different databases that manage length, width, and height, respectively. In such an example, the item identification service 250 may start with three keys, "NA-chair-L90" for the length database, "NA-chair-W90" for the width database, and "NA-chair-H45" for the height database. The item identification service 250 then looks up each of the generated composite keys, and traverses the sorted item keys in a sequential manner in each database. Such lookups may be conducted in parallel or in sequence.

At block 306C, the item identification service 250 combines the search result obtained for each composite key and removes any duplicative items. In the example above having a separate database for each dimensional value, item identifiers associated with NA-chair-L90 through NA-chair-L100, NA-chair-W90 through NA-chair-W100, and NA-chair-H45 through NA-chair-H50 may be combined and any duplicative item identifiers may be removed.

In the process 306, one or more of the blocks shown in FIG. 3B may be removed (e.g., not performed), modified, and/or the order in which the method 306 is performed may be switched. Thus, the embodiments of the present disclosure are not limited to or by the example shown in FIG. 3B, and other variations may be implemented without departing from the spirit of this disclosure Complementary or Related Items In some embodiments, the item identification service 250 may identify complementary or related items that do not exactly correspond to the keywords provided by the user but are stored in association with the items that do correspond to the user-provided keywords. For example, the complementary or related items may be identified using a meronym, a hypernym, or a hyponym of the keywords provided by the user. A meronym is a word that denotes part of another item. For example, steering wheel is a meronym of car. A hypernym is a word that has a broader meaning that more specific words fall under. For example, furniture is a hypernym of couch and coffee table. Hyponym is word that has a more specific meaning encompassed by a broader term. For example, couch and coffee table are hyponyms of furniture. The complementary or related items may be identified using the WordNet electronic lexical database (available from Princeton University). In other implementations, the items may be associated based on color (e.g., if the user is searching for a black couch, the item identification service 250 further identify a black coffee table as a related item), user-submitted pictures (e.g., if a threshold number of images provided by users include the same two items, an association may be created between the two items), or user searches (e.g., if the same two keywords appear in a threshold number of search requests, an association may be created between the two items). The items may be associated based on style (e.g., if the item identification service 250 determines that the image of the user's living room shows one or more items from a particular furniture store or provider (e.g., IKEA), the item identification service 250 may further identify another IKEA-style item as a related item, as opposed to a piece of antique furniture).

The associations among the complementary and/or related items may be defined in one or more databases. For example, a hyponym database indicating hyponyms of various words may be created, and the item identification service 250 may access such a hyponym database to determine hyponyms of a particular word (e.g., a search term that is included in the search request initiated by a user). For example, the hyponym database may include composite keys that begin with the particular word and further include one or more hyponyms of the particular word (e.g., "furniture-coffee-table," "furniture-couch," etc.). Other associations (e.g., meronyms, hypernyms, similar color, similar style, etc.) may be created and stored in a similar manner. By storing the complementary or related items as keys rather than values in the database, the lookup time associated with retrieving the complementary or related items of a particular item can be reduced, since the values associated with the keys need not be accessed.

In some implementations, the databases indicating the associations among the complementary and/or related items may be integrated into the databases storing the item identifiers. For example, the database storing the item identifiers may contain keys that begin with "furniture-" (e.g., "furniture-chair," "furniture-couch," "furniture-coffee-table," etc.), which may be used by the item identification service 250 to return chairs and coffee tables, even if the user has searched for couches.

3-D Scanning of Items

In some embodiments, the item attributes 272 may include three-dimensional (3-D) attributes of the items such as the vertices, angles, corners, curvature, shape, etc. The item attributes 272 may further include actual dimensions of the items, rather than the dimensions of the packaging in which the items are provided. The item attributes 272 may also include normal vectors of the items, which can be used to describe orientations of surfaces of the items. For example, the item identification service 250 may use the normal vectors to properly orient the items when determining whether the items satisfy the dimensional criteria of the physical space.

Example Use Case: Physical Store

In some cases, the user may wish to go to a physical store and browse items in person. In such cases, the user can take a picture of his or her living room (or any other physical space in which the user wishes to place the new items), go to the store, and take additional pictures of the items that the user wishes to purchase. Upon receiving both the picture of the user's physical space and the items that the user wishes to purchase, the item identification service 250 may determine the dimensional criteria of the physical space and the dimensions of the items that the use wishes to purchase, and indicate to the user whether the items can fit in the user's physical space. In addition, the item identification service 250 may identify and display additional items that satisfy the dimensional criteria of the user's physical space. The additional items may be identified at least in part based on the characteristics of the items at the store that the user took pictures of. For example, if the user captured an image of a black coffee table, the item identification service 250 may identify and display additional black coffee tables that would fit in the user's physical space. The item identification service 250 may superimpose the image of the user's physical space on top of the images of the items that the wishes to purchase to provide a preview of how the pictured item might be placed in the user's physical space (e.g., using any known augmented reality techniques).

Alternatively, the user may already be at his or her favorite store and may wish to know whether certain items would fit in his or her room. In such a case, the user may capture images of those items (or store information associated with those items such as the serial numbers) while browsing items at the store, and when the user gets home, he or she can capture an image of the physical space in which the user desires to place the items. Upon receiving the images depicting the items (or other information identifying the items) and the image depicting the physical space (or other information defining the physical space), the item identification service 250 may determine the dimensional criteria of the physical space and determine whether any of the items can fit in the physical space. As described above, the item identification service 250 may also identify and display additional items (e.g., items in the electronic catalog of the interactive computing system 210) that satisfy the dimensional criteria of the user's physical space.

Replacing an Item

In some embodiments, the user may take a picture of the item that the user wishes to replace. For example, the item identification service 250 may provide two different modes (e.g., a "replace mode" for users wishing to replace an item, and a "fill mode" for users wishing to fill the depicted space with a new item). Based on which mode is selected by the user, the item identification service 250 may determine the dimensional criteria accordingly. If the replace mode is selected, the item identification service 250 may generate a bounding box based on the space occupied by the depicted item, and determine the dimensional criteria based on the dimensions of the bounding box.

Other Considerations

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure and protected by the following claims.

What is claimed is:

1. A system for identifying items that satisfy dimensional criteria specified by a user, the system comprising:
   an electronic data storage system comprising one or more databases that each store item keys that are sorted, wherein each item key is associated with one or more item identifiers, wherein each item identifier identifies a corresponding item from a plurality of items; and
   a computing system comprising one or more hardware computing devices executing specific computer-executable instructions, said computing system in communication with the electronic data store, and configured to at least:
      receive a search request transmitted by a user computing device associated with a user, the search request including an image that depicts a physical space, one or more search terms, and information indicative of the user's interest in placing one or more items associated with the one or more search terms within the physical space, wherein the physical space is at least partially bound by one or more objects depicted in the image;
      analyze the image to determine dimensional criteria of the physical space, wherein the dimensional criteria comprise a length, a width, a height, or a volume of the physical space;

generate one or more composite search keys based at least in part on the dimensional criteria of the physical space and the one or more search terms, wherein each composite search key includes two or more of the length, width, height, or volume of the physical space in a particular order;

identify, based at least on the one or more composite search keys, a first set of item keys stored in the one or more databases, wherein an individual item key includes two or more dimension values in the particular order and is associated with one or more item identifiers that each identify a corresponding item associated with the two or more dimension values;

determine a set of items that satisfy the dimensional criteria, wherein determining the set of items includes: identifying candidate items based at least on each one of the candidate items being associated with at least one item key in the first set and removing any duplicative candidate items; and output the determined set of items for presentation to a user.

2. The system of claim 1, wherein the computing system is further configured to:
receive a user selection of one of the items in the determined set of items; and
output additional details associated with the selected item.

3. The system of claim 2, wherein the additional details include a user interface for initiating a transaction for purchasing the selected item.

4. A system comprising:
an electronic data store configured to store at least item keys that are sorted and one or more item identifiers associated with each item key, wherein each item identifier identifies a corresponding item from a plurality of items; and
a computing system comprising one or more hardware computing devices executing specific computer-executable instructions, said computing system in communication with the electronic data store, and configured to at least:
receive a search request including search criteria associated with a three-dimensional (3-D) bounding box;
determine dimensional criteria of the 3-D bounding box based at least in part on the search criteria included in the search request;
generate a composite search key based at least in part on the search criteria, wherein the composite search key includes at least a portion of the determined dimensional criteria;
identify, based at least on the generated composite search key, one or more item keys stored in the electronic data;
determine a set of items that satisfy the dimensional criteria, wherein determining the set of items includes identifying candidate items that are each associated with at least one of the one or more item keys and removing any duplicative candidate items; and
output information identifying one or more of the determined set of items in response to the search request.

5. The system of claim 4, wherein the search criteria associated with the 3-D bounding box is an image that depicts a physical space at least partially bound by one or more other objects depicted in the image, wherein the 3-D bounding box corresponds to the physical space depicted in the image.

6. The system of claim 5, wherein the computing system is further configured to superimpose an overlay image associated with at least one of the determined set of items on the image that depicts the physical space.

7. The system of claim 5, wherein the computing system is further configured to provide a user interface for scrolling through the one or more items in the determined set of items.

8. The system of claim 4, wherein the dimensional criteria of the 3-D bounding box is determined based at least in part on an image that depicts an item occupying a physical space, wherein the 3-D bounding box corresponds to the physical space occupied by the item depicted in the image.

9. The system of claim 4, wherein the dimensional criteria of the 3-D bounding box comprises length, width, and height information of a physical space.

10. The system of claim 4, wherein the item identifiers are stored in a compressed format, wherein the computing system is further configured to decompress each item identifier associated with the determined set of items prior to outputting the information identifying the one or more items in the determined set.

11. The system of claim 4, wherein the electronic data store comprises a first database storing a first set of item keys and a second database storing a second set of item keys, wherein the first set of item keys is associated with at least one dimensional parameter that is not associated with the second set of item keys.

12. The system of claim 4, wherein each item in the determined set of items has:
an item length that is greater than a first threshold percentage of, but less than or equal to, the length of the 3-D bounding box;
an item width that is greater than a second threshold percentage of, but less than or equal to, the width of the 3-D bounding box;
an item height that is greater than a third threshold percentage of, but less than or equal to, the height of the 3-D bounding box; and
an item volume that is greater than a fourth threshold percentage of, but less than or equal to, the volume of the 3-D bounding box.

13. The system of claim 4, wherein the search criteria include one or more of (i) a keyword associated with an item, (ii) a type of an item, or (iii) a color of an item.

14. The system of claim 4, wherein the electronic data store comprises a first database storing a first set of item keys associated with items having volumes within a first volume range and a second database storing a second set of item keys associated with items having volumes within a second volume range that is different from the first volume range, wherein the computing system is further configured to:
determine that a volume of the 3-D bounding box is within the first volume range; and
based on the determination that the volume of the 3-D bounding box is within the first volume range, search for the candidate items in the first database instead of the second database.

15. A computer-implemented method comprising:
as implemented by one or more computing devices configured with specific executable instructions,
receiving a search request including dimensional criteria associated with a physical space, wherein the dimensional criteria includes one or more of a length, a width, or a height of the physical space;
generating a composite search key associated with the search request, wherein the composite search key includes at least a portion of the dimensional criteria;

identifying, based at least on the composite search key, one or more item keys from a plurality of item keys stored and sorted in an electronic data store, wherein an individual item key of the plurality of item keys is associated with one or more item identifiers that each identify a corresponding item;

determining a set of items that satisfy the dimensional criteria based at least in part on the one or more identified item keys; and outputting information identifying one or more of the determined set of items in response to the search request.

16. The method of claim 15, further comprising:

determining volume information based on the length, width, and height included in the search request; and filtering at least some of the item keys stored in the electronic data store based at least on the volume information.

17. The method of claim 15, further comprising filtering the item keys using one or more keywords included in the search request prior to identifying the one or more item keys.

18. The method of claim 15, wherein the generated composite search key includes one or more keywords included in the search request.

19. The method of claim 15, further comprising generating a plurality of composite search keys, wherein each composite search key includes (i) a length value followed by a volume value, (ii) a width value followed by the volume value, or (iii) a height value followed by the volume value.

20. The method of claim 15, further comprising:

generating an additional composite search key based on a word that is stored in association with at least one of one or more keywords included in the search request; and identifying an additional candidate item in the electronic data store using the additional composite search key.

21. The method of claim 20, further comprising:

determining a complementary candidate item that, in combination with the additional candidate item identified using the additional composite search key, satisfies the dimensional criteria; and providing an indication that the complementary candidate item and the additional candidate item collectively satisfy the dimensional criteria.

22. The method of claim 20, wherein the word is one of a meronym, a hypernym, or a hyponym of the at least one of the one or more keywords.

23. The method of claim 20, further comprising creating the association between the word and the at least one keyword of based at least in part on prior searches performed.

* * * * *